United States Patent
Boss et al.

(10) Patent No.: US 10,678,071 B2
(45) Date of Patent: *Jun. 9, 2020

(54) SMART CONTACT LENS DATA TRANSFER USING LI-FI

(71) Applicant: INTERNATIONAL BUSINESS MACHINES CORPORATION, Armonk, NY (US)

(72) Inventors: Gregory J. Boss, Saginaw, MI (US); John E. Moore, Jr., Brownsburg, IN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,956

(22) Filed: Mar. 29, 2019

(65) Prior Publication Data

US 2019/0227348 A1 Jul. 25, 2019

Related U.S. Application Data

(63) Continuation of application No. 15/415,017, filed on Jan. 25, 2017, now Pat. No. 10,330,957.

(51) Int. Cl.
| | |
|---|---|
| *H04B 10/00* | (2013.01) |
| *G02C 11/00* | (2006.01) |
| *G02C 7/04* | (2006.01) |
| *H04B 10/116* | (2013.01) |

(52) U.S. Cl.
CPC ............... *G02C 11/10* (2013.01); *G02C 7/04* (2013.01); *H04B 10/116* (2013.01)

(58) Field of Classification Search
CPC .......... G02C 11/10; G02C 7/04; H04B 10/116
USPC ......................................................... 398/118
See application file for complete search history.

(56) References Cited

U.S. PATENT DOCUMENTS

| | | |
|---|---|---|
| 8,608,310 B2 | 12/2013 | Otis et al. |
| 9,111,473 B1 | 8/2015 | Ho et al. |
| 9,158,133 B1 | 10/2015 | Pletcher et al. |
| 9,843,385 B2 | 12/2017 | Deyle et al. |
| 2014/0282877 A1 | 9/2014 | Mahaffey et al. |

(Continued)

OTHER PUBLICATIONS

Ulanoff, "Google Smart Contact Lenses Move Closer to Reality", http://mashable.com/2014/04/21/google-smart-contact-lenses-patents/#BnSjXZDsXsqA, Mashable, Apr. 21, 2014, 10 pages.

(Continued)

*Primary Examiner* — Don N Vo
(74) *Attorney, Agent, or Firm* — Jay Wahlquist; Andrew D. Wright; Roberts Calderon Safran & Cole, P.C.

(57) ABSTRACT

Systems and methods for smart contact lens data transfer using Light Fidelity (Li-Fi) are disclosed. In embodiments, a computer-implemented method, comprises: pairing a smart contact lens with a remote computing device, the smart contact lens including a data receiving device and a light transmitting device; receiving, by the smart contact lens, data from the remote computing device; and transmitting, by the light transmitting device of the smart contact lens, the data to a receiver device through Li-Fi communication between the light transmitting device of the smart contact lens and the receiving device.

20 Claims, 5 Drawing Sheets

(56) References Cited

U.S. PATENT DOCUMENTS

| | | | |
|---|---|---|---|
| 2017/0289120 A1 | 10/2017 | Kohli et al. | |
| 2018/0036974 A1 | 2/2018 | Hahn et al. | |
| 2018/0114431 A1* | 4/2018 | Volam | G08B 25/10 |
| 2018/0121211 A1* | 5/2018 | Bohdan | G06F 9/4403 |
| 2018/0224669 A1 | 8/2018 | Shtukater | |
| 2018/0227051 A1* | 8/2018 | Shim | H04B 1/38 |
| 2019/0286806 A1* | 9/2019 | Robinson | G06F 21/35 |

OTHER PUBLICATIONS

Purcher, "Google Takes their Glass Vision to Smart Contact Lenses", http://www.patentlymobile.com/2014/03/google-takes-their-google-glass-vision-to-smart-contact-lenses.html, Patently Mobile, Mar. 21, 2014, 12 pages.

Prigg, "Glass without the glasses: Google patents smart contact lens system with a Camera built in", http://www.dailymail.co.uk/sciencetech/article-2604543/Glass-without-glasses-Google-patents-smart-contact-lens-Camera-built-in.html, DailyMail.com, Apr. 14, 2014, 23 pages.

Ali, "Now Google plans to install camera in your eyes", http://virginwords.com/now-google-plans-to-install-camera-in-your-eyes/#sthash.Qinqgl6q.dpbs, VirginWords, Aug. 9, 2014, 6 pages.

Crew, "Li-Fi has just been tested in the real world, and it's 100 times faster than Wi-Fi", http://www.sciencealert.com/li-fi-tested-in-the-real-world-for-the-first-time-is-100-times-faster-than-wi-fi, Science Alert, Nov. 24, 2015, 3 pages.

Anonymous, "LED Light to Transfer High-speed Data on the Horizon", http://tek-think.com/2015/07/11/technology-uses-led-light-to-transfer-high-speed-data/,Tek-Think.com, Jul. 11, 2015, 10 pages.

Anonymous, "Google Contact Lens", https://en.wikipedia.org/wiki/Google_Contact_Lens, Wikipedia, Jan. 14, 2014, 2 pages.

Lin, LiFi Smartphone Prototype Explores New Internet Commercial Paths, http://www.ledinside.com/news/2013/11/lifi_smartphone_prototype_explores_new_internet_commercial_paths, LEDinside, Nov. 7, 2013, 3 pages.

Ghori, "Li-Fi: Technology that Uses Light Bulb to Establish Internet Connection", http://propakistani.pk/2013/10/21/li-fi-technology-that-uses-light-bulb-to-establish-internet-connection/, ProPakistani.Pk, Oct. 21, 2013, 2 pages.

Tenderich, "NewsFlash: Google is Developing Glucose-Sensing Contact Lenses!", http://www.healthline.com/diabetesmine/newsflash-google-is-developing-glucose-sensing-contact-lenses#3, HealthLine, Jan. 16, 2014, 8 pages.

Thompson, "Google has an idea to make a smart contact lens that runs on solar power", http://www.techinsider.io/google-awarded-patent-for-solar-powered-contact-lens-2015-10, Business Insider, Oct. 21, 2015, 2 pages.

Anthony, "Google's smart contact lenses for diabetics: Another step towards the Googlepowered cyborg", http://www.extremetech.com/extreme/174979-the-next-step-in-googles-cyborg-plans-smart-contact-lenses-for-those-with-diabetes, ExtremeTech, Jan. 17, 2014, 8 pages.

List of IBM Patents or Patent Applications Treated as Related, Mar. 29, 2019, 1 page.

* cited by examiner

SMART CONTACT LENS DATA TRANSFER USING LI-FI

BACKGROUND

The present invention relates generally to light fidelity (Li-Fi) communication and, more particularly, to smart contact lens data transfer using Li-Fi.

Li-Fi technology operates under the principle that light can be used to carry signals as an alternative to traditional radio frequencies; it keeps serving as long as there is no blockage of any kind between a light source and a light reviving device. For example, one-watt light emitting diodes (LEDs) may establish an internet connection for four electronic gadgets at once. A light bulb with embedded microchips can produce data rates as fast as 150 Mbps.

Some attempts have been made to transfer information digitally through wearable devices, such as glasses or smart watches. Further, some attempts have been made to incorporate communications technology into contact lenses in order to transmit glucose level data to a user for health reasons. However, current technologies do not address the use of Li-Fi communications between individuals through smart contact lenses, nor do they address the use of Li-Fi communications for personal authentication utilizing smart contact lenses.

SUMMARY

In an aspect of the invention, a computer-implemented method includes: pairing a smart contact lens with a remote computing device, the smart contact lens including a data receiving device and a light transmitting device; receiving, by the smart contact lens, data from the remote computing device; and transmitting, by the light transmitting device of the smart contact lens, the data to a receiver device through Light Fidelity (Li-Fi) communication between the light transmitting device of the smart contact lens and the receiving device.

In another aspect of the invention, there is a computer program product for smart contact lens data transfer using Light Fidelity (Li-Fi). The computer program product comprises a computer readable storage medium having program instructions embodied therewith. The program instructions are executable by a computing device to cause the computing device to: receive a selection of data to be transferred via Li-Fi between a first smart contact lens paired with the computing device and a second smart contact lens; send the data to a data receiving device of the first smart contact lens; and receive an acknowledgement signal from the first smart contact lens indicating that the data was sent to the second smart contact lens.

In another aspect of the invention, there is a system for smart contact lens data transfer using Light Fidelity (Li-Fi). The system includes a smart contact lens comprising: a light transmitting device adapted to send light signals; a data receiving device adapted to receive one or more packets of data from a remote computing device; and a microcontroller adapted to transmit the one or more packet of data via Li-Fi communications between the light transmitting device of the smart contact lens and a receiving device.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
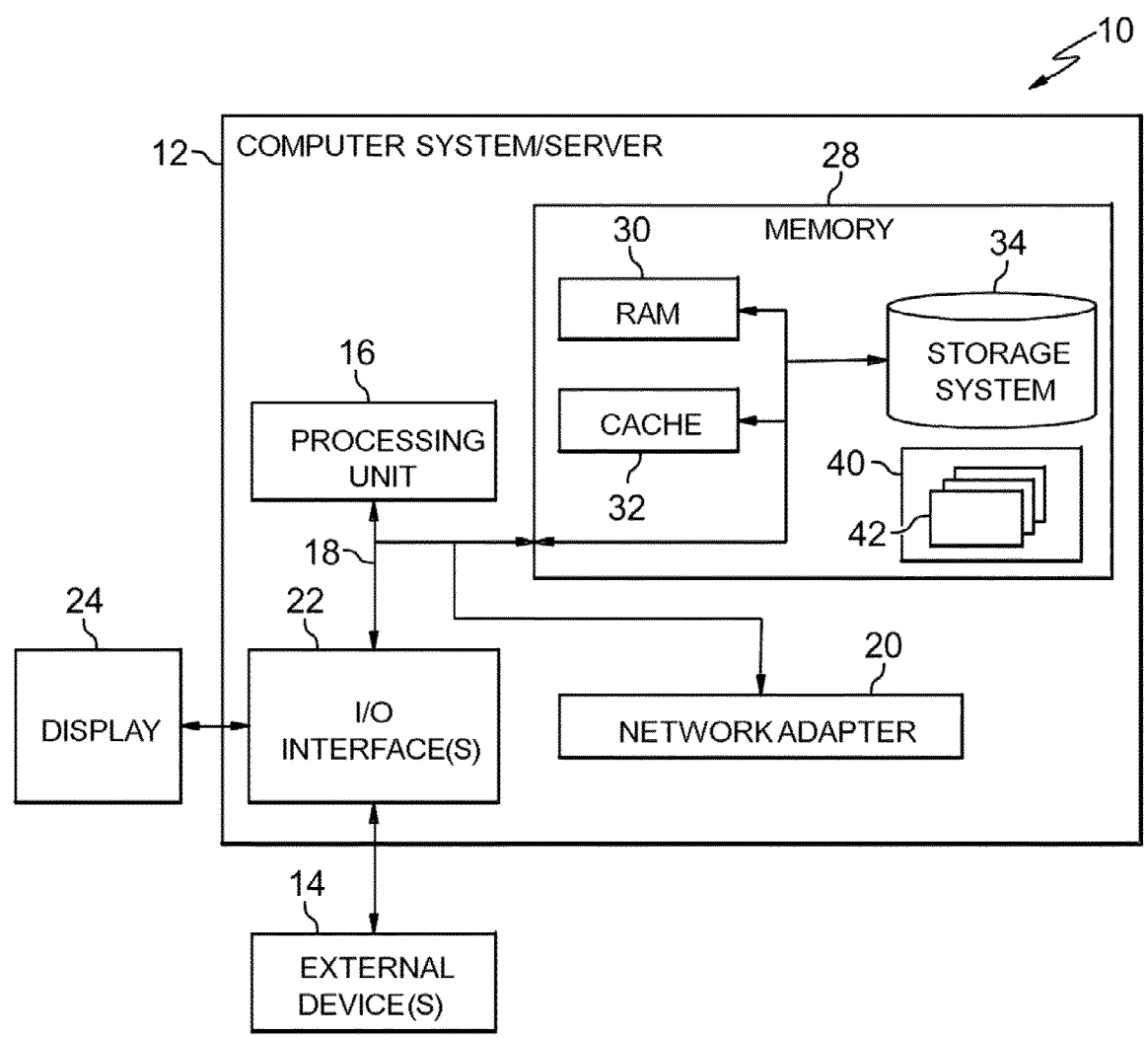
FIG. 1 depicts a computing infrastructure according to an embodiment of the present invention.

The present invention relates generally to light fidelity (Li-Fi) communication and, more particularly, to smart contact lens (hereafter "smart lens") data transfer using Li-Fi. In embodiments, a system and method of data transfer is provided using a smart lens (an eye-mountable contact lens formed of a substantially transparent polymeric material) and voice recognition of a user. In embodiments, data transmission can be determined if a user closes his or her eyes for more than a predetermined period of time (e.g., 2 seconds). In embodiments, a data transfer system employs the following: a method to transfer data from one smart lens to another smart lens using embedded Li-Fi lights; a method to transfer data from a smart lens to other computing devices such as cell phones, computers, etc.; a method to initiate and control the flow of data using a combination of vocal cues and eye movements; and a method to use embedded Li-Fi in smart lenses and focal tracking devices to perform user authentication.

In embodiments, an eye mountable contact lens formed of a substantially transparent polymeric material includes a substrate embedded in the polymeric material. A controller and associated loop antenna are attached to the substrate for radio frequency communication with a user device having a data file. A light emitting diode is attached to the substrate and is connected to the controller for transmitting data to a remote receiver device, wherein a light beam from the light emitting diode is modulated by data from the data file, the data having been received via the loop antenna.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
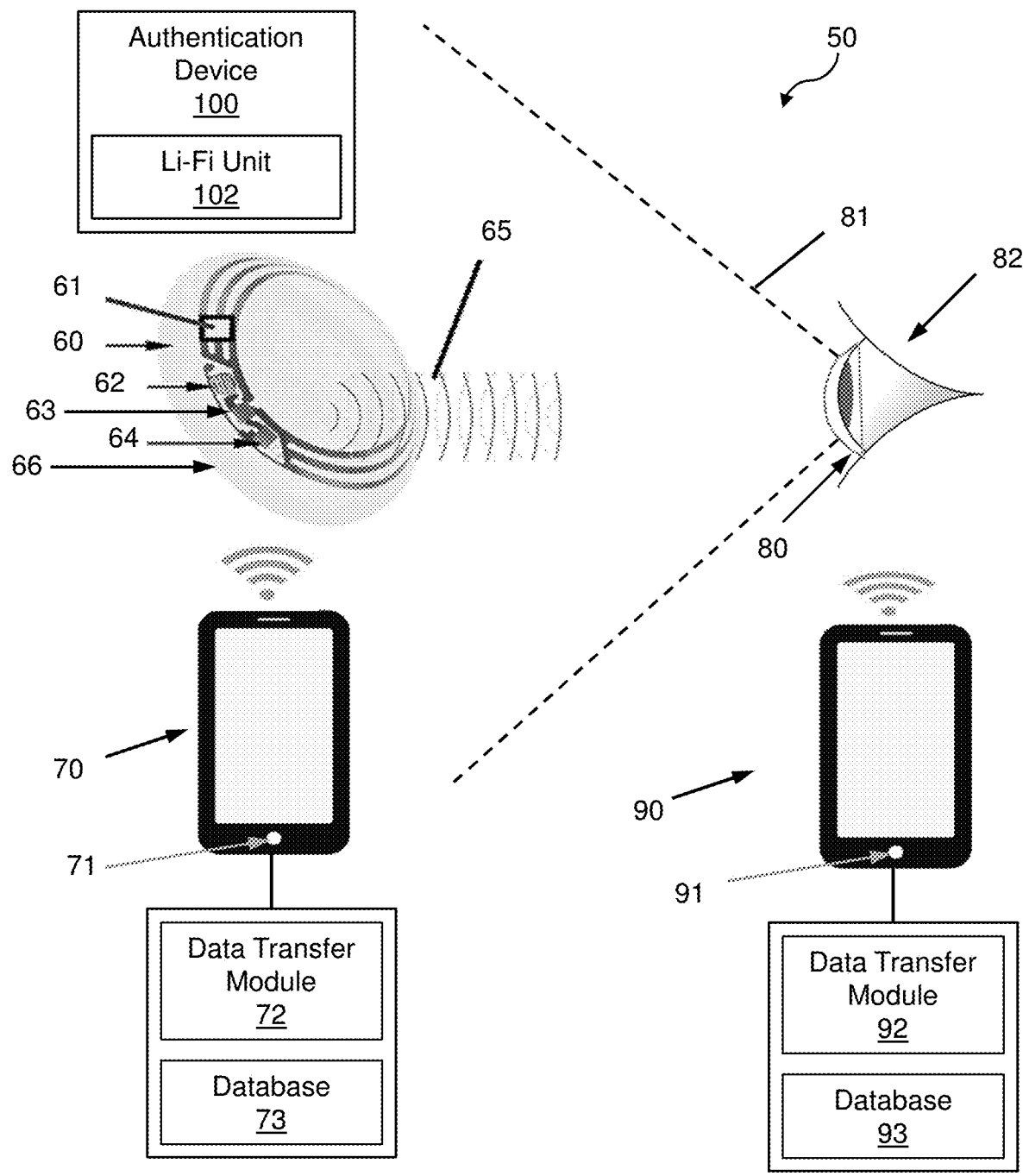
FIG. 2 shows an exemplary environment in accordance with aspects of the invention.

FIG. 2 shows an exemplary Li-Fi communications system 50 in accordance with aspects of the invention. The Li-Fi communications system 50 includes a first smart lens (Receiver's lens) 60 in communication with a first user device (Receiver's device) 70, and second smart lens (Sender's lens) 80 in communication with a second user device (Sender's device) 90. The second smart lens 80 is also shown in communication with the first smart lens 60, the first user device 70 and an authentication device 100. The first smart lens 60 includes a content lens substrate 66, a light transmitting device 61, a photodetector 62, a microcontroller 63, and a data receiving portion 64. Conventional contact lens substrates may be utilized in accordance with the invention. In embodiments, the light transmitting device 61 is in the form of a light emitting diode (LED) light. In embodiments, the data receiving portion 64 is in the form of a chip and radio antenna adapted to send and receive radio communications indicated at 65. In aspects, existing smart lenses may be adapted for use with the present invention. Conventional power systems for smart lenses may also be utilized in accordance with the invention. Although the second smart lens 80 is not depicted in detail, it should be understood that the second smart lens 80 may have an identical structure to the first smart lens 60.

In embodiments, the first and second user computer devices 70 and 90 may be general purpose computing devices, such as desktop computers, laptop computers, tablet computers, smartphones, etc., including one or more components of the computer device 12 of FIG. 1. In embodiments, the first user computer device 70 includes a photodetector indicated at 71, a data transfer module 72 and a database 73. Likewise, in embodiments the second user device 90 includes a photodetector 91, a data transfer module 92 and a database 93. In aspects, the authentication device 100 is a general purpose computing device, such as a desktop computer, laptop computer, tablet computer, smartphone, etc., including one or more components of the computer device 12 of FIG. 1. In aspects, the authentication device 100 is a special purpose computing device enabling user authentication for a specific application (e.g., security screening device, etc.).

Still referring to FIG. 2, the data transfer modules 72 and 92 are configured to perform one or more of the functions described herein. The data transfer modules 72 and 92 may include one or more program modules (e.g., program module 42 of FIG. 1) executed by the respective first and second user devices 70 and 90. In embodiments, the data transfer modules 72 and 92 are configured to transfer data from the respective first and second user devices 70 and 90 to a respective first and second smart lens 60 and 80 via radio communication technology. In aspects, the data transfer module (72 or 92) transfers data utilizing one or more data transfer sessions between the database (73 or 93) of the data transfer module and the data receiving portion (64) of the smart lens (60 or 80). In embodiments, the first and second smart lenses 60 and 80 are configured to communicate with another device (e.g., authentication device 100) when the other device is in the field of view 81 of a wearer's eye 82. In embodiments, the data transfer modules 72 and 92 are adapted to communicate with one of the smart lenses 60, 80 in real time, without the need for any data store in the smart lenses 60, 80.

Figure 3:
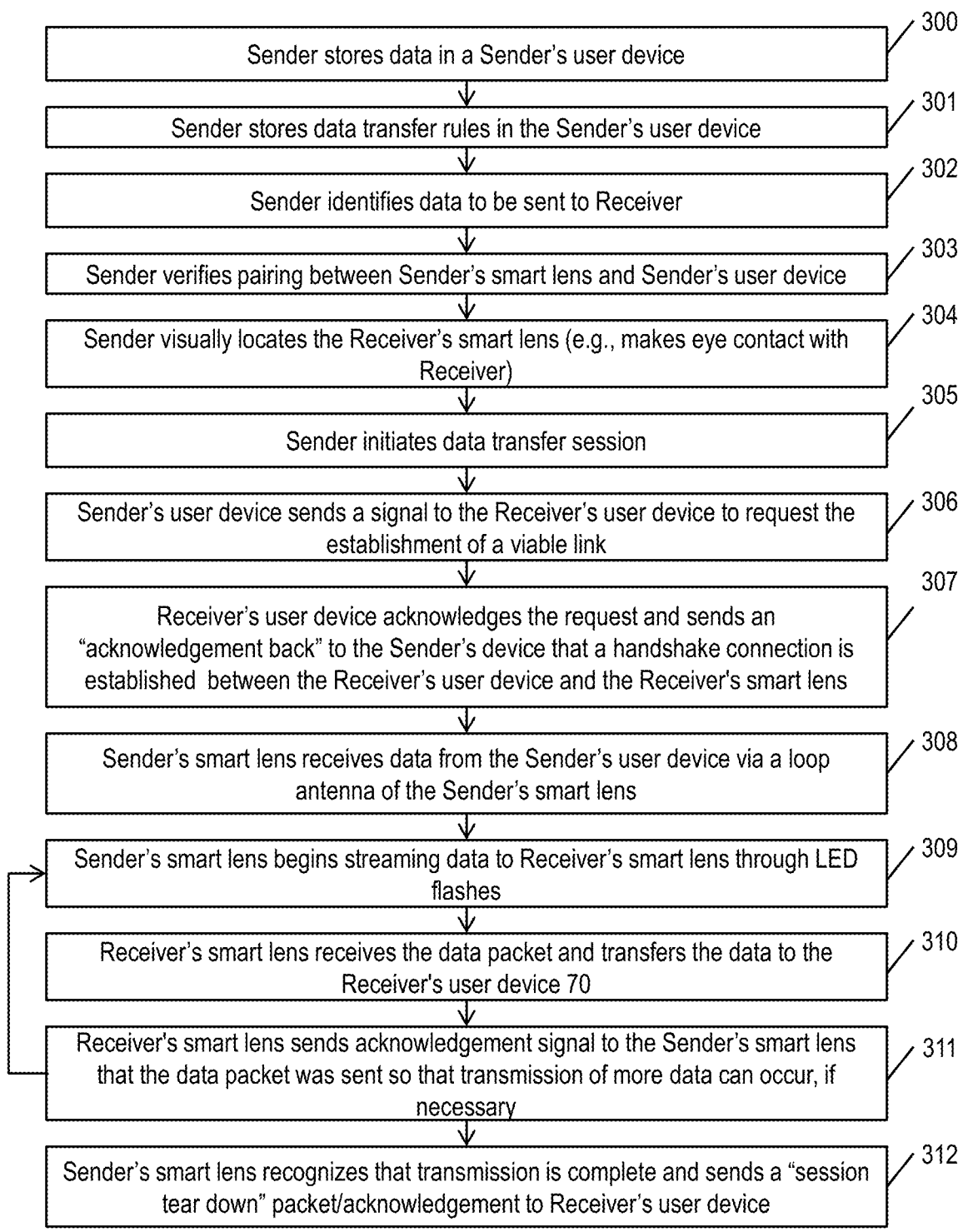
FIG. 3 shows a flowchart of a smart lens to smart lens communication method in accordance with aspects of the invention.

FIG. 3 shows a flowchart of a smart lens to smart lens communication method in accordance with aspects of the invention. Steps of the method of FIG. 3 may be performed within the system 50 illustrated in FIG. 2, and are described with reference to elements shown in FIG. 2.

At step 300, a Sender (wearer of the second smart lens 80) stores data in the second user device 90. In embodiments, data is downloaded to the second user device 90 from a network connection (not shown) and is saved in the database 93. By way of example, the second user device 90 may be a smartphone that downloads contact data to the database 93.

At step 301, the Sender stores data transfer rules in the second user device 90. In embodiments, data transfer rules are downloaded to the second user device 90 from a network connection (not shown) and are saved in the database 93. In aspects, data transfer rules can be in the form of an app downloaded to the second user device 90. The data transfer rules may be location based rules, time based rules, or context aware rules.

At step 302, the Sender identifies data to be sent to a Receiver (wearer of the first smart lens 60). In embodiments, the Sender can manually select data stored within the database 93 of the second user's device 90 to identify the data the Sender wishes to transfer to the Receiver. In embodiments, the Sender can utilize voice recognition software stored within the second user's device 90 to recognize voice commands to select data stored within the database 93 to transfer to the Receiver. Other methods for selecting data to transfer can be utilized in accordance with step 300.

At step 303, the Sender verifies a pairing between the second smart lens 80 and the second user device 90. By way of example, the second user device 90 may display a special data transfer screen to the Sender through a display of the second user device 90, and the Sender may verify the pairing by viewing the screen.

At step 304, the Sender visually locates the first smart lens 60 (the Receiver's smart lens). In embodiments, the Sender makes eye contact with the Receiver at step 304. In embodiments, the Receiver is within the field of view 81 of the Sender.

At step 305, the Sender initiates a data transfer session. In embodiments, voice recognition software on the second user device 90 receives an initiation command and the data transfer module 92 initiates transfer of data through one or more radio communication data transfers from the second user device 90 to the data receiving portion (not shown) of the second smart lens 80. In aspects, the data transfer event can be initiated based on contextual analysis of the Sender's spoken words, a voice command, or a manual input in the paired second user device 90. In embodiments, the Sender initiates the one or more radio communication data transfers through a manual command utilizing a user interface (e.g., I/O interface(s) 22 of the second user device 90.

It should be understood that steps 302-305 need not be performed in a particular order, and may be combined in embodiments of the invention. For example, in one embodiment, the Sender visually locates the first smart lens 60 of the Receiver in accordance with step 304. If the Sender continues to look at the first smart lens 60 for a predetermined threshold time period, then a data transfer option will be presented to the Sender. In embodiments, the second smart lens 80 sends a radio communication signal to the second user device 90 when the Sender has looked a the first smart lens 60 for the predetermined threshold time period, and in response, the second user device 90 presents the data transfer options to the Sender through a display (e.g., 24) of the second user device 90. The Sender may then verify the pairing between the second smart lens 80 and the second user device 90 in accordance with step 303 of FIG. 3. For example, the second user device 90 may present a digital business card, presentation, or other data in the form of PPTX or PDF files, etc. In embodiments, the data transfer options are presented to the user through a heads-up display (not shown). In embodiments, the user looks at the data transfer option they wish to select, and the heads-up display (not shown) will recognize which data transfer option the user wishes to select using eye tracking data or photodetectors in accordance with step 302 of FIG. 3. Alternatively, the Sender may manually select the data to be transferred utilizing the second user device 90 in accordance with step 302 of FIG. 3. For example, a user may utilize a touchscreen of the second user device 90 to select a file to transfer. In embodiments, the second user device 90 will recognize the selection of the data to be transferred and will initiate the data transfer session based on the user selection in accordance with step 305 of FIG. 3.

At step 306, the second user device 90 sends a signal to the first user device 70 to request the establishment of a viable link between the first user device 70 and the first smart lens 60. In embodiments, the data transfer module 92 of the second user device 90 sends the signal to the data transfer module 72 of the first user device 70.

At step 307, the first user device 70 receives and acknowledges the request from step 304, and sends an "acknowledgment back" to the second user device 80 that a handshake connection has been established between the first user device 70 and the first smart lens 60.

At step 308, an antenna of the data receiving portion 64 of the second smart lens 80 receives data from the second user device 90. In embodiments, the data is received at the data receiving portion 64 of the second smart lens 80 in real time from the data transfer module 92 of the second user device 90. Power for the second smart lens 80 may be provided using a small solar power panel (not shown).

At step 309, the second smart lens 80 begins streaming data to the first smart lens 60 through Li-Fi data transfer. In embodiments, the microcontroller (not shown) of the second smart lens 80 controls the flashing of the LED (not shown) of the second smart lens 80 to transfer data received from the data transfer module 72 at step 306 to the photodetector 62 of the first smart lens 60. In embodiments, data is transferred between the second smart lens 80 and the first smart lens 80 using, for example, light patterns utilized in fiber optic communications. In embodiments, data transfer is controlled by the data transfer module 92 of the second user device 90 based on location, time or contextual analysis of the Senders surroundings utilizing rules and context data stored within the database 93 of the second user device 90. It should be understood that steps 308 and 309 can be performed in real time to effect real-time Li-Fi transfer of data between the second smart lens 80 and the first smart lens 60. Power for the first smart lens 60 may be provided using a small solar power panel (not shown).

At step 310, the first smart lens 60 receives the streaming data from the second smart lens 80 and sends the second smart lens 80 a transmission acknowledging that the data package has been received, so that the transmission of more data can occur, if necessary. In embodiments, the first smart lens 60 receives data at the photodetector 62 in the form of light messages from the LED (not shown) of the second smart lens 80, and the microcontroller 63 transfers the received data to the database 73 of the first user device 70. In embodiments, the microcontroller 63 of the first smart lens 60 effects the conversion of Li-Fi signals received at the photodetector 62 to radio communication signals which transfer the data to the database 72 of the first user device 70.

At step 311, the first smart lens 60 sends an acknowledgment signal to the second smart lens 80 indicating that the data packet was sent, and that the transmission of more data between the second smart lens 80 and the first smart lens 60 can occur, if necessary. In embodiments, a light signal is sent from the LED 61 of the first smart lens 60 to the data receiving portion (not shown) of the second smart lens 80 as the acknowledgment signal.

Steps 309-311 may occur as many times as necessary to complete the transfer of data identified at step 302. For example, in embodiments, a first data packet may be followed by a second data packet, and so on, until the entire data set to be transferred has been received and acknowledged in accordance with step 311.

At step 312, the second smart lens 80 recognizes that transmission of data is complete and sends a "session tear down" packet/acknowledgment to the first smart lens 60. In embodiments, the microcontroller (not shown) of the second smart lens 80 recognizes that no more data is received from the data transfer module 92 of the second user device 90 and causes the "session tear down" packet/acknowledgement to transfer via Li-Fi communication to the photodetector 62 of the first smart lens 60.

Utilizing the method of FIG. 3, a tiny LED light (e.g., LED 61) of a Sender's smart lens (e.g., 80) can transfer data to a Receiver's smart lens (e.g., 60) when the Receiver's smart lens (e.g., 60) is within the line of sight of the Sender's smart lens (e.g., 80) such that the photodetector (e.g., 61) of the Receiver's smart lens (e.g., 60) can detect the light transmitted by the LED light. While described with respect to the transfer of data from the second user device 90 through the second smart lens 80 to the first user device 70 by way of the first smart lens 60, it should be understood that the first smart lens 60 can communicate data to the second smart lens 80 in the manner described in FIG. 3. Accordingly, data can be transferred between individual user's of smart lenses 60 and 80. In one use scenario, an attendee of a conference may wish to obtain specific information (e.g., references, business card data, etc.) that a presenter will only share with attendees at the conference and within a specific time frame. In this scenario, the attendee may obtain the information from the presenter using smart lens to smart lens Li-Fi communication in accordance with methods described herein.

Figure 4:
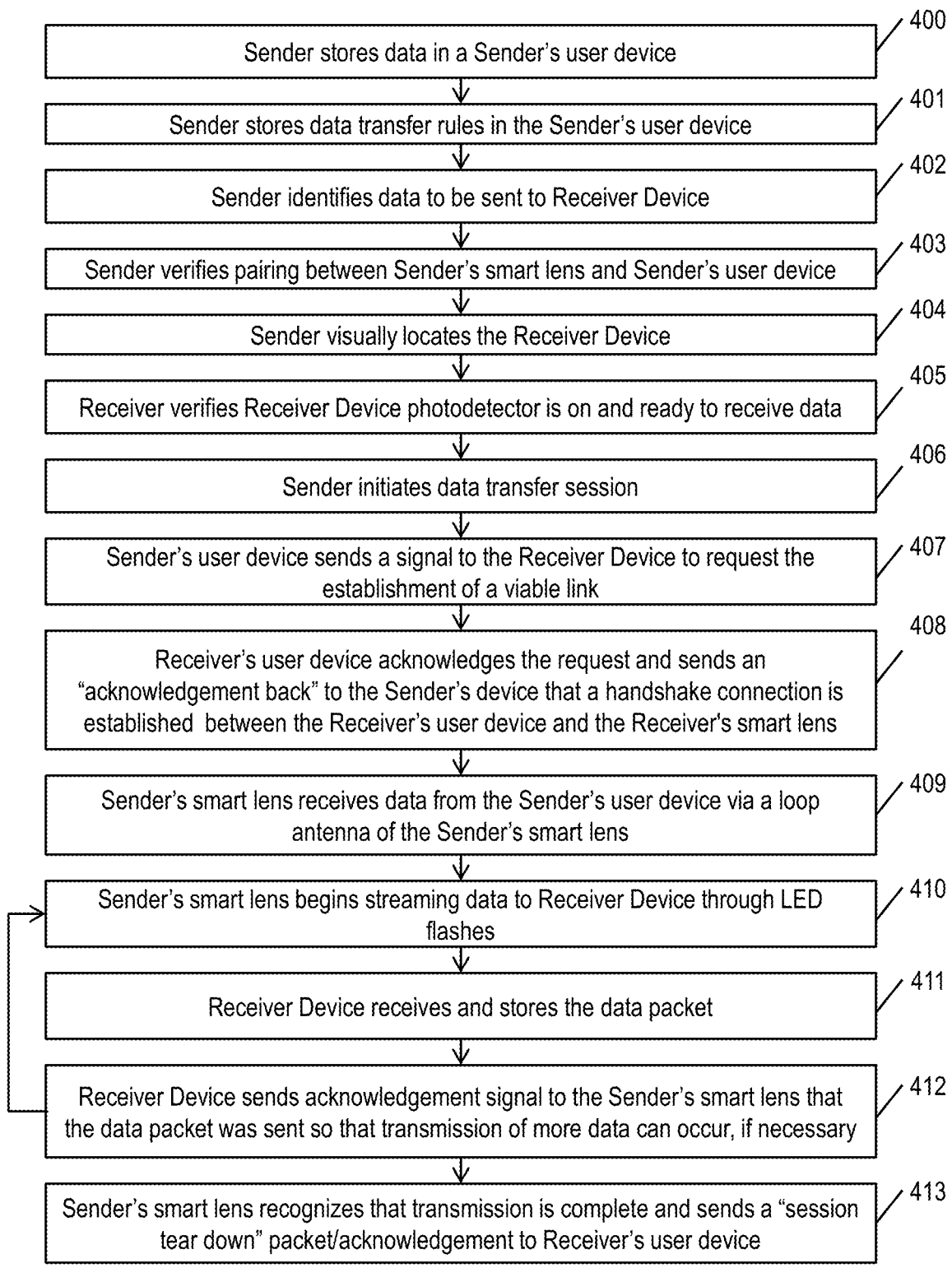
FIG. 4 shows a flowchart of a smart lens to receiver device communication method in accordance with aspects of the invention.

FIG. 4 shows a flowchart of a smart lens to receiving device communication method in accordance with aspects of the invention. Steps of the method of FIG. 4 may be performed within the system 50 illustrated in FIG. 2, and are described with reference to elements shown in FIG. 2.

At step 400, a Sender (wearer of the second smart lens 80) stores data in the second user device 90. In embodiments, data is downloaded to the second user device 90 from a network connection (not shown) and is saved in the database 93. By way of example, the second user device 90 may be a smartphone that downloads contact data to the database 93.

At step 401, the Sender stores data transfer rules in the second user device 90. In embodiments, data transfer rules are downloaded to the second user device 90 from a network connection (not shown) and are saved in the database 93. In aspects, data transfer rules can be in the form of an app downloaded to the second user device 90. The data transfer rules may be location based rules, time based rules, or context aware rules.

At step 402, the Sender identifies data to be sent to the first user device 70 (Receiver Device). In embodiments, the Sender can manually select data stored within the database 93 of the second user's device 90 that the Sender wishes to identify for transfer to the first user device 70. In embodiments, the Sender can utilize voice recognition software stored within the second user's device 90 to recognize voice commands to select data stored within the database 93 to transfer to the first user device 70. Other methods for selecting data to transfer can be utilized in accordance with step 402.

At step 403, the Sender verifies a pairing between the second smart lens 80 and the second user device 90. By way of example, the second user device 90 may display a special data transfer screen to the Sender through a display of the second user device 90, and the Sender may verify the pairing by viewing the screen.

At step 404, the Sender visually locates the first user device 70. In embodiments, the Sender makes eye contact with the first user device 70 at step 404. In embodiments, the first user device 70 is within the field of view 81 of the Sender.

At step 405, a Receiver verifies that the first user device 70 photodetector is on and ready to receive data. In embodiments, the first user device 70 provides a screen indicating to a viewer that the first user device 70 is on and ready to receive data.

At step 406, the Sender initiates a data transfer session. In embodiments, voice recognition software on the second user device 90 receives an initiation voice command from the Sender and the data transfer module 92 initiates transfer of data through one or more radio communication data transfers from the second user device to the data receiving portion (not shown) of the second smart lens 80. In aspects, the data transfer event can be initiated based on contextual analysis of Sender's spoken words, voice command, or manual input in the paired second user device 90. In embodiments, the Sender initiates the one or more radio communication data transfers through a manual command utilizing a user interface (e.g., I/O interface(s) 22 of the second user device 90).

Similar to the method of FIG. 3, it should be understood that steps 402-406 need not be performed in a particular order, and may be combined in embodiments of the invention. For example, in one embodiment, the Sender visually locates the first user device 70 of the Receiver in accordance with step 404 of FIG. 4. If the Sender continues to look at the first user device 70 for a predetermined threshold time period, then a data transfer option will be presented to the Sender. In embodiments, the second smart lens 80 sends a radio communication signal to the second user device 90 when the Sender has looked a the first user device 70 for the predetermined threshold time period, and in response, the second user device 90 presents the data transfer options to the Sender through a display (e.g., 24) of the second user device 90. The Sender may then verify the pairing between the second smart lens 80 and the second user device 90 in accordance with step 403 of FIG. 4. For example, the second user device 90 may present a digital business card, presentation, or other data in the form of PPTX or PDF files, etc. In embodiments, the data transfer options are presented to the user through a heads-up display (not shown). In embodiments, the user looks at the data transfer option they wish to select, and the heads-up display (not shown) will recognize which data transfer option the user wishes to select using eye tracking data or photodetectors to identify data to be sent in accordance with step 402 of FIG. 4. Alternatively, the Sender may manually select the data to be transferred utilizing the second user device 90 in accordance with step 402 of FIG. 4. For example, a user may utilize a touchscreen of the second user device 90 to select a file to transfer. In embodiments, the second user device 90 will recognize the selection of the data to be transferred and will initiate the data transfer session based on the user selection in accordance with step 406 of FIG. 4.

At step 407, the second user device 90 sends a signal to the first user device to request the establishment of a viable link. In embodiments, the data transfer module 92 of the second user device 90 sends the signal to the data transfer module 72 of the first user device 70.

At step 408, the first user device 70 receives and acknowledges the request from step 407, and sends an "acknowledgment back" to the second user device 80 that a handshake connection has been established between the first user device 70 and the second user device 90.

At step 409, an antenna of the data receiving portion 64 of the second smart lens 80 receives data from the second user device 90. In embodiments, the data is received at the data receiving portion 64 of the second smart lens 80 in real time from the data transfer module 92 of the second user device 90.

At step 410, the second smart lens 80 begins streaming data to the first user device 70 through Li-Fi data transfer. In embodiments, the microcontroller (not shown) of the second smart lens 80 controls the flashing of the LED (not shown) of the second smart lens 80 to transfer data received from the data transfer module 72 at step 409 to the photodetector 71 of the first user device 70. In embodiments, data is transferred between the second smart lens 80 and the first user device 70 using light patterns such as patterns utilized in fiber optic communications. In embodiments, data transfer is controlled by the data transfer module 92 of the second user device 90 based on location, time or contextual analysis of the Senders surroundings utilizing rules and context data stored within the database 93 of the second user device 90. It should be understood that steps 409 and 410 can be performed in real time to effect real-time Li-Fi transfer of data between the second smart lens 80 and the first user device 70.

At step 411, the first user device 70 receives the streaming data from the second smart lens 80 and sends the second smart lens 80 a transmission acknowledging that the data package has been received, so that the transmission of more data can occur, if necessary. In embodiments, the first user device 70 receives data at the photodetector 71 in the form of light messages from the LED (not shown) of the second smart lens 80, and a processor of the first user device 70 (e.g., processing unit 16) stores the transferred data in a database (e.g., system memory 28).

At step 412, the first user device 70 sends an acknowledgment signal to the second smart lens 80 indicating that the data packet was sent, and that the transmission of more data between the second smart lens 80 and the first user device 70 can occur, if necessary.

Steps 410-412 may occur as many times as necessary to complete the transfer of data identified at step 402.

At step 413, the second smart lens 80 recognizes that transmission of data is complete and sends a "session tear down" packet/acknowledgment to the first user device 70. In embodiments, the microcontroller (not shown) of the second smart lens 80 recognizes that no more data is received from the data transfer module 92 of the second user device 90 and causes the "session tear down" packet/acknowledgement to transfer via Li-Fi communication to the photodetector 71 of the first user device 70.

Utilizing the method of FIG. 4, a tiny LED light (e.g., 61) of a Sender's smart lens (e.g., 80) can transfer data to a Receiver Device (e.g., 70) when the Receiver Device (e.g., 70) is within the line of sight 100 of the Sender's smart lens (e.g., 80) such that the photodetector 71 of the Receiver Device (e.g., 70) can detect the light transmitted by the LED light (e.g., 61). While discussed with respect to a second smart lens 80 transmitting information to a Receiver Device, it should be understood that the Receiver Device may include its own light transmitting device, such as an LED (not shown), which can transmit data via Li-Fi communication with the photodetector of the second smart lens 80.

Figure 5:
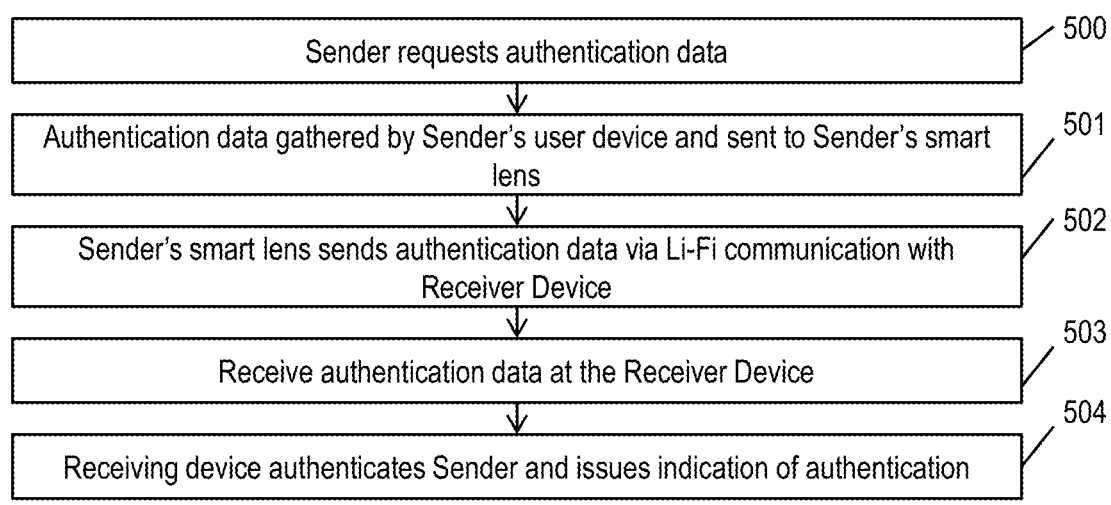
FIG. 5 shows a flowchart of steps of a method in accordance with aspects of the invention.

FIG. 5 shows a flowchart of a method in accordance with aspects of the invention. Steps of the method of FIG. 5 may be performed within the system 50 illustrated in FIG. 2, and are described with reference to elements shown in FIG. 2. The method of FIG. 5 may be utilized in conjunction with the methods of FIG. 4 or 5 to provide authentication before a user-selected data transfer between a Sender (wearer of the second smart lens 80) and a Receiver Device (e.g., authentication device 100, first smart lens 60, or first user device 70) occurs.

At step 500, a Sender (wearer of the second smart lens 80) requests authentication data from the second user device 90. In embodiments, the Sender may select an authentication option from a screen of options displayed by the second user device 90, may issue a voice command that is recognized by voice recognition software of the second user device 90, or may perform a gesture utilizing a wearable device (e.g., smartwatch not shown) in communication with the second user device 90 to request authentication data from the second user device 90. In aspects, authentication data is stored in the database 93 of the second user device 90.

At step 501, the authentication data is gathered by the second user device 90 and is sent to the second smart lens 80 via radio communication. In embodiments, authentication data stored in the database 93 of the second user device 90 is sent to the data receiving portion (not shown) of the second smart lens 80 by the data transfer module 92.

At step 502, the second smart lens 80 sends the authentication data from step 501 to the Receiver Device (e.g., authentication device 100, first smart lens 60, or first user device 70) via Li-Fi communication with the Receiver Device. In embodiments, the LED light (not shown) of the first smart lens 80 sends light signals that are received at a photodetector (e.g., 62, 71, Li-Fi Unit 102) of the Receiver Device.

At step 503, the Receiver Device receives the authentication data. In embodiments, the photodetector (e.g., 62, 71, Li-Fi Unit 102) of the Receiver Device receives the light signal data from the second smart lens 80.

At step 504, the Receiver Device authenticates the Sender using the authentication data received at step 503, and indicates that the Sender is authenticated. In embodiments, the Receiver Device enables the transfer of data from the second smart lens 80 to the Receiver Device after authentication of the Sender. For example, steps 500-504 of FIG. 5 may be performed before the step 307 of FIG. 3 or 408 of FIG. 4 are completed. In aspects, the Receiver Device indicates that the Sender is authenticated by enabling further communications between the first smart lens 80 and the Receiver Device. In aspects, the Receiver Device displays an indication that the Sender is authenticated through a display (e.g., 24).

In embodiments, controls may be in place within the system 50 to prevent data transfer when certain predetermined conditions are met. For example, the first and second user devices 70 and 90 may be programmed such that Li-Fi communication cannot be initiated when the first and second user devices 70 and 90 recognize that a user is in a car (e.g., global positioning technology of the first and second user devices 70, 90 recognize that the user is moving at an accelerated pace). In embodiments, the system 50 will restrict Li-Fi communication based on a time of the day. Restriction policies may be located on the user device (70, 90) paired with a smart lens (60, 80). In embodiments, the system 50 will restrict Li-Fi communication based on the user device (70, 90) recognizing that the user is in a geo-fenced area based on policies or rules stored in the user device (70, 90). In another embodiment, data transmission may be governed based on analysis of the user's surroundings. By way of example, an embedded camera (not shown) in the smart lens (60, 80) may capture surrounding environment images and transmit them to the paired user device (70, 90), which may perform an analysis of the images to determine if any of the image patterns match predetermined pattern policies or rules stored in the user device database (73, 93).

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for smart contact lens data transfer using Light Fidelity (Li-Fi). In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-program product comprising a computer readable storage medium having program instructions embodied therewith, the program instructions executable by a smart contact lens to cause the smart contact lens to:
   pair with a remote computing device;
   receive data from the remote computing device at a data receiving device of the smart contact lens; and
   transmit, by a light transmitting device of the smart contact lens, the data to a receiver device through Light Fidelity (Li-Fi) communication between the light transmitting device of the smart contact lens and the receiving device, wherein the receiver device is distinct from the remote computing device.

2. The computer-program product of claim 1, wherein the program instructions further cause the smart contact lens to:
   receive Li-Fi communication data from the receiving device; and
   send the Li-Fi communication data to the remote computing device.

3. The computer-program product of claim 1, wherein the program instructions further cause the smart contact lens to: receive the data from the remote computing device, wherein the transmitting the data to the receiver device is performed in real time.

4. The computer-program product of claim 1, wherein the program instructions further cause the smart contact lens to send acknowledgement data via radio communication from the smart contact lens to the remote computing device, wherein the acknowledgment data indicates that the data was transmitted by the smart contact lens.

5. The computer-program product of claim 1, wherein the data receiving device is a loop antenna.

6. The computer-program product of claim 1, wherein the receiver device is selected from the group consisting of: an authentication device, a second computing device, and a second smart contact lens.

7. The computer-program product of claim 1, wherein the light transmitting device comprises a light emitting diode.

8. A system comprising:
   a processor, a computer readable memory, and a computer readable storage medium associated with a computing device; and
   program instructions to receive a selection of data to be transferred via Li-Fi between a first smart contact lens paired with the computing device and a second smart contact lens;
   program instructions to send the data to a data receiving device of the first smart contact lens via radio communication signals, wherein the computing device sends the data to the data receiving device of the first smart contact lens based on predetermined data transfer rules; and
   program instructions to receive an acknowledgement signal from the first smart contact lens indicating that the data was sent to the second smart contact lens,
   wherein the program instructions are stored on the computer readable storage medium for execution by the computing device via the computer readable memory.

9. The system of claim 8, further comprising:
   program instructions to send a signal to a second computing device paired with the second smart contact lens to request establishment of a link between the second computing device and the second smart contact lens; and program instructions to send, upon receipt of the acknowledgement signal, a session tear down message to the second computing device indicating an end of a data transmission session.

10. The system of claim 8, further comprising: program instructions to present, to a wearer of the first contact lens, a data transfer option based on the wearer of the first contact lens looking at the second smart contact lens for a predetermined threshold period of time.

11. The system of claim 8, further comprising program instructions to display an indication that the computing device is paired with the first smart contact lens.

12. The system of claim 8, wherein receiving the selection of data to be transferred comprises at least one of the group consisting of:
    receive a manual selection of data through a user interface of the computing device; and
    receive a voice command from a user indicating the selection of data.

13. A computer-implemented method comprising:
    sending, by a computing device, one or more packets of data to a data receiving device of a smart contact lens based on predefined data transfer rules, wherein the data is configured to be transferred by the smart contact lens via Li-Fi to a remote receiver device, and wherein the computing device comprises a processor, a computer readable memory, a computer readable storage medium associated with the computing device, and program instructions stored on the computer readable storage medium for execution by the computing device via the computer readable memory to cause the computing device to send the one or more packets of data.

14. The computer-implemented method of claim 13, further comprising storing, by the computing device, the predetermined data transfer rules, wherein the predetermined data transfer rules are selected from the group consisting of: rules based on location; rules based on time; and rules based on contextual analysis of the user's surroundings.

15. The computer-implemented method of claim 13, further comprising receiving, by the computing device, acknowledgement data via radio communication from the smart contact lens, wherein the acknowledgment data indicates that the one or more packets of data were transmitted to the receiver device by the smart contact lens.

16. The computer-implemented method of claim 13, wherein the remote receiver device is selected from the group consisting of: an authentication device, a second computing device, and a second smart contact lens.

17. The computer-implemented method of claim 13, wherein the remote receiver device is a second smart contact lens paired with a second computing device and the method further comprises:
    sending, by the computing device, a signal to the second computing device requesting the establishment of a viable link between the second computing device and the second smart contact lens; and
    sending, by the computing device, a session tear down acknowledgement to the second computing device.

18. The computer-implemented method of claim 17, wherein the smart contact lens includes a light transmitting device adapted to send light signals, wherein:
    the remote receiver device is a second computing device; and
    the light transmitting device comprises a light emitting diode adapted to send Li-Fi communication signals to a photodetector of the remote receiving device.

19. The computer-implemented method of claim 13, further comprising:
    receiving, by the computing device, a request for authentication data; and
    gathering, by the computing device, authentication data and send the authentication data to the data receiving device of the smart contact lens,
    wherein the smart contact lens is adapted to send the authentication data from the smart contact lens to the remote receiver device via Li-Fi communication, and the remote receiver device is in the form of an authentication device enabling user authentication.

20. The computer-implemented method of claim 13, further comprising presenting, by the computing device, a data transfer option to a wearer of the first contact lens, based on the wearer of the smart contact lens looking at a second smart contact lens for a predetermined threshold period of time.

* * * * *